US008620710B2

(12) United States Patent
Farrell et al.

(10) Patent No.: US 8,620,710 B2
(45) Date of Patent: Dec. 31, 2013

(54) MANAGING CALENDAR EVENTS WHILE PREPARING FOR TIME OUT-OF-OFFICE

(75) Inventors: Colm Farrell, Dublin (IE); Liam Harpur, Dublin (IE); Patrick J. O'Sullivan, Dublin (IE); Fred Raguillat, Meath (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 12/497,206

(22) Filed: Jul. 2, 2009

(65) Prior Publication Data

US 2011/0004503 A1    Jan. 6, 2011

(51) Int. Cl.
 *G06Q 10/00* (2012.01)
(52) U.S. Cl.
 USPC ....... 705/7.16; 705/7.15; 705/7.18; 705/7.19; 705/7.21; 705/319
(58) Field of Classification Search
 USPC ............ 705/7.15, 7.16, 7.18, 7.19, 7.21, 319
 See application file for complete search history.

(56) References Cited

U.S. PATENT DOCUMENTS

| 384,856 A | 6/1888 | Kintneb |
|---|---|---|
| 701,543 A | 6/1902 | Cockburn |
| 730,648 A | 6/1903 | Heberle |
| 1,153,510 A | 9/1915 | Mosler et al. |
| 2,275,459 A | 3/1942 | Harry |
| 3,096,404 A | 7/1963 | Semon |
| 3,151,923 A | 10/1964 | Bell et al. |
| 3,309,467 A | 3/1967 | Gorgas |
| 3,483,424 A | 12/1969 | Woodnutt |
| 3,749,845 A | 7/1973 | Fraser |
| 4,071,710 A | 1/1978 | Burnett |
| 4,160,323 A | 7/1979 | Tracy |
| 4,199,665 A | 4/1980 | Emrick |
| 4,201,020 A | 5/1980 | Saunders |
| RE31,319 E | 7/1983 | Fraser |
| 4,869,531 A | 9/1989 | Rees |
| 5,119,415 A | 6/1992 | Aoyama |
| 5,182,705 A | 1/1993 | Barr et al. |
| 5,197,774 A | 3/1993 | Diaz |
| 5,428,784 A | 6/1995 | Cahill |
| 5,476,558 A | 12/1995 | Yoshida |
| 5,557,515 A | 9/1996 | Abbruzzese et al. |
| 5,671,557 A | 9/1997 | Carlson et al. |
| 5,717,571 A | 2/1998 | Helot |

(Continued)

OTHER PUBLICATIONS

Weber, J. S., & Yorke-Smith, N. (2009). Designing for usability of an adaptive time management assistant. AI Magazine, 30(4), 103-109.*

(Continued)

*Primary Examiner* — Lynda Jasmin
*Assistant Examiner* — Timothy Padot
(74) *Attorney, Agent, or Firm* — Marcia L. Doubet

(57) ABSTRACT

In a calendar messaging method and system, a calendar application executing on a computer receives a command to activate an out-of-office status, and receives one or more selected calendar events. The method and system further include automatically updating the calendar events, wherein the updating includes at least one of canceling the calendar events, and removing the user as an invitee of the calendar events. An out-of-office message is then automatically sent to at least one recipient indicating a type of update made to one or more of the calendar events.

11 Claims, 2 Drawing Sheets

(56) References Cited

U.S. PATENT DOCUMENTS

| | | | |
|---|---|---|---|
| 5,788,575 | A | 8/1998 | Fluster |
| 5,879,691 | A | 3/1999 | Sagel et al. |
| 5,894,017 | A | 4/1999 | Sagel et al. |
| 5,946,386 | A | 8/1999 | Rogers et al. |
| 5,960,173 | A | 9/1999 | Tang et al. |
| 5,971,850 | A | 10/1999 | Liverance |
| 6,021,720 | A | 2/2000 | Boos |
| 6,052,563 | A | 4/2000 | Macko |
| 6,057,841 | A | 5/2000 | Thurlow et al. |
| 6,181,994 | B1 | 1/2001 | Colson |
| 6,208,725 | B1 | 3/2001 | Davies |
| 6,260,486 | B1 | 7/2001 | Boos |
| 6,349,327 | B1 | 2/2002 | Tang et al. |
| 6,366,849 | B1 | 4/2002 | Rychlak |
| 6,396,170 | B1 | 5/2002 | Laufenberg et al. |
| 6,409,186 | B2 | 6/2002 | Bennington |
| 6,431,708 | B2 | 8/2002 | Krebs |
| 6,457,040 | B1 | 9/2002 | Mizuhara et al. |
| 6,457,132 | B1 | 9/2002 | Borgendale |
| 6,512,764 | B1 | 1/2003 | Carew et al. |
| 6,580,787 | B1 | 6/2003 | Akhteruzzaman et al. |
| 6,585,162 | B2 | 7/2003 | Sandbach et al. |
| 6,590,877 | B1 | 7/2003 | Yamakita |
| 6,618,716 | B1 | 9/2003 | Horvitz |
| 6,631,840 | B1 | 10/2003 | Muramatsu |
| 6,640,222 | B1 | 10/2003 | Briancon |
| 6,640,230 | B1 | 10/2003 | Alexander et al. |
| 6,651,085 | B1 | 11/2003 | Woods |
| 6,671,508 | B1 | 12/2003 | Mitsuoka et al. |
| 6,678,719 | B1 | 1/2004 | Stimmel |
| 6,731,323 | B2 * | 5/2004 | Doss et al. .................. 348/14.01 |
| 6,731,929 | B2 | 5/2004 | Winkler |
| 6,732,080 | B1 * | 5/2004 | Blants .......................... 705/7.18 |
| 6,738,914 | B2 | 5/2004 | Christopher |
| 6,785,379 | B1 | 8/2004 | Rogers et al. |
| 6,788,927 | B2 | 9/2004 | Pohutsky et al. |
| 6,804,336 | B2 | 10/2004 | Chiu |
| 6,829,349 | B1 | 12/2004 | Neale et al. |
| 6,836,881 | B2 | 12/2004 | Beynon et al. |
| 6,842,505 | B1 | 1/2005 | Suder |
| 6,845,160 | B1 | 1/2005 | Aoki |
| 6,857,006 | B1 | 2/2005 | Nishizawa |
| 6,861,961 | B2 | 3/2005 | Sandbach |
| 6,886,002 | B2 | 4/2005 | Horvitz |
| 6,886,099 | B1 | 4/2005 | Smithson et al. |
| 6,898,715 | B1 | 5/2005 | Smithson et al. |
| 6,947,774 | B2 | 9/2005 | Davis |
| 6,980,993 | B2 | 12/2005 | Horvitz et al. |
| 6,987,523 | B2 | 1/2006 | Fujiwara |
| 6,988,128 | B1 | 1/2006 | Alexander et al. |
| 7,010,145 | B1 | 3/2006 | Haruki et al. |
| 7,028,060 | B2 | 4/2006 | Daniell |
| 7,030,730 | B1 | 4/2006 | Zondervan |
| 7,051,086 | B2 | 5/2006 | Rhoads et al. |
| 7,054,650 | B2 | 5/2006 | Bohmer |
| 7,076,241 | B1 | 7/2006 | Zondervan |
| 7,080,027 | B2 | 7/2006 | Luby et al. |
| 7,093,025 | B1 | 8/2006 | Gupta |
| 7,093,293 | B1 | 8/2006 | Smithson et al. |
| 7,099,310 | B1 | 8/2006 | Carew et al. |
| 7,110,574 | B2 | 9/2006 | Haruki et al. |
| 7,117,445 | B2 | 10/2006 | Berger |
| 7,123,706 | B2 | 10/2006 | Ooki |
| 7,124,087 | B1 | 10/2006 | Rodriguez et al. |
| 7,137,099 | B2 | 11/2006 | Knight et al. |
| 7,144,249 | B2 | 12/2006 | Rizoiu |
| 7,177,859 | B2 | 2/2007 | Pather et al. |
| 7,182,448 | B2 | 2/2007 | Godil |
| 7,187,537 | B2 | 3/2007 | Liao |
| 7,190,778 | B2 | 3/2007 | Kucmerowski |
| 7,209,916 | B1 | 4/2007 | Seshadri et al. |
| 7,218,926 | B2 | 5/2007 | Bocking et al. |
| 7,225,257 | B2 | 5/2007 | Aoike et al. |
| 7,233,933 | B2 | 6/2007 | Horvitz et al. |
| 7,243,130 | B2 | 7/2007 | Horvitz et al. |
| 7,263,181 | B2 | 8/2007 | Chung |
| 7,272,633 | B2 | 9/2007 | Malik et al. |
| 7,747,458 | B2 * | 6/2010 | Lyle et al. .................... 705/7.19 |
| 7,987,110 | B2 * | 7/2011 | Cases et al. .................. 705/7.13 |
| 2001/0014866 | A1 * | 8/2001 | Conmy et al. .................... 705/9 |
| 2005/0288987 | A1 * | 12/2005 | Sattler et al. ...................... 705/9 |
| 2008/0127231 | A1 * | 5/2008 | Shaffer et al. ................. 719/328 |
| 2009/0265426 | A1 * | 10/2009 | Svendsen et al. ............. 709/204 |

OTHER PUBLICATIONS

Meeting Maker Launches Comprehensive, Scalable and Extensible Collaborative Scheduling Platform. Business/Technology Editors. Business Wire [New York] May 14, 2002: 1.*

* cited by examiner

MANAGING CALENDAR EVENTS WHILE PREPARING FOR TIME OUT-OF-OFFICE

BACKGROUND

The use of calendar programs that allow the user to schedule and keep track of events, such as appointments and tasks, is widespread. Some calendar programs include an out-of-office feature that allows the user to designate that he/she is currently out of the office. However, as a person's schedule becomes increasingly busy, and as the number of scheduled events in the calendar program increases, the difficulty in managing the scheduled events increases.

For example, although the out-of-office feature may allow the user to set auto reply e-mails during the user's time out-of-office and/or mark the users time out of the office as busy, conventional calendar programs require the user to manually edit every meeting that is scheduled during the time out of office in order to cancel them. The user may want to maintain some important meetings to remain scheduled because the meetings are important and/or include important people. Sometimes, however, the user might inadvertently cancel repeating meetings that fall outside the out-of-office time frame. Currently, the conventional out-of-office feature does not provide the user with rich functionality for managing meetings while preparing for a time out-of-office.

BRIEF SUMMARY

In a calendar messaging method and system, a calendar application executing on a computer receives a command to activate an out-of-office status, and receives one or more selected calendar events. The method and system further include automatically updating the calendar events, wherein the updating includes at least one of canceling the calendar events, and removing the user as an invitee of the calendar events. An out-of-office message is then automatically sent to at least one recipient indicating a type of update made to one or more of the calendar events.

DETAILED DESCRIPTION OF THE INVENTION

The present invention relates to calendaring program functionality corresponding to a time out-of-office. The following description is presented to enable one of ordinary skill in the art to make and use the invention and is provided in the context of a patent application and its requirements. Various modifications to the preferred embodiments and the general principles and features described herein will be readily apparent to those skilled in the art. Thus, the present invention is not intended to be limited to the embodiments shown, but is to be accorded the widest scope consistent with the principles and features described herein.

The exemplary embodiment provides a method and system for managing calendar events while a user prepares for time out-of-office. In response to a calendar application receiving a command from the user to activate an out-of-office status, the calendaring application may update the calendar events that are scheduled during the user's time out-of-office by automatically cancelling the calendar events or by removing the user's name from a list of invitees, and automatically sending a notification message of the updates.

Figure 1:
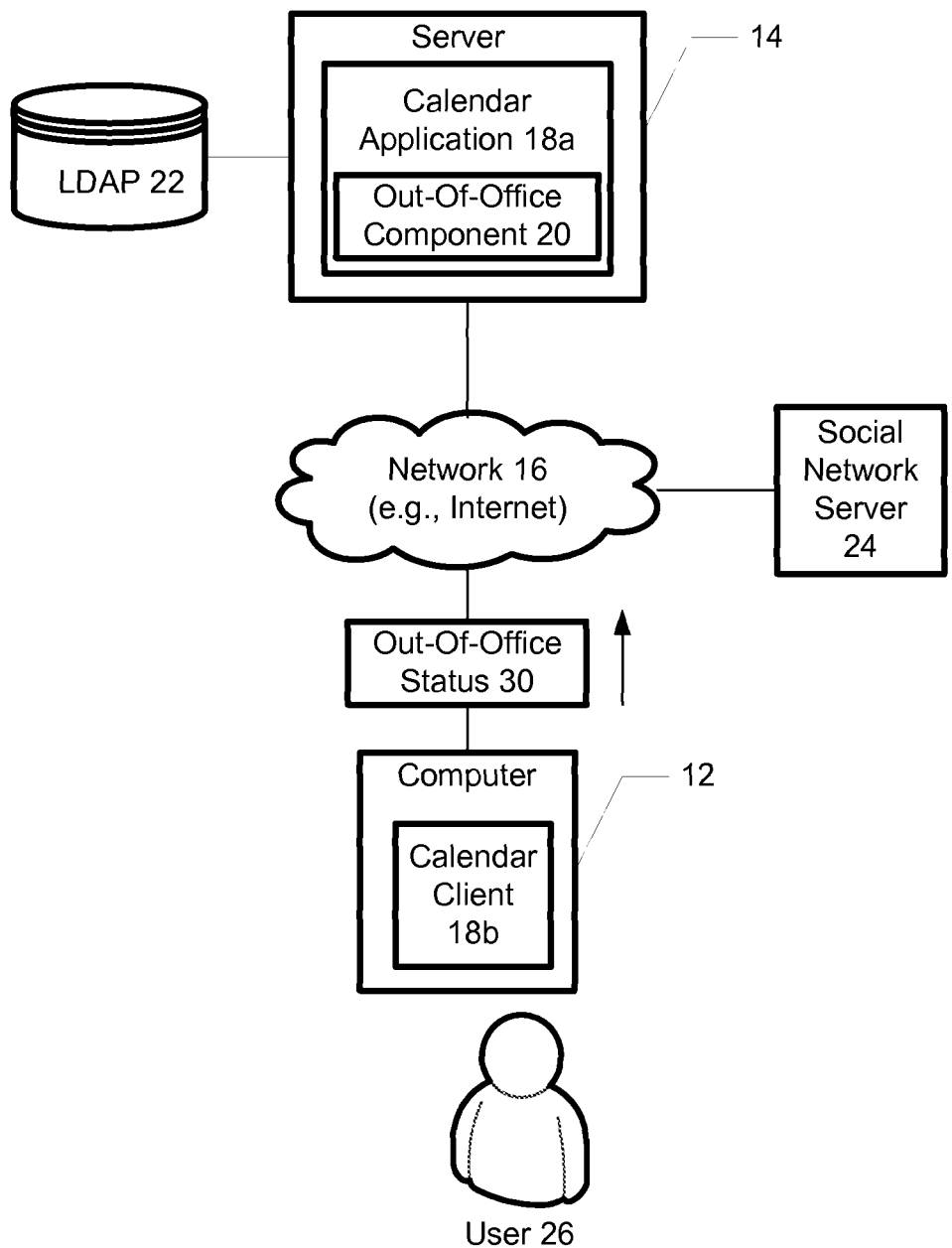
FIG. 1 is a logical block diagram illustrating an exemplary system environment in which one embodiment for managing calendar events may be implemented.

FIG. 1 is a logical block diagram illustrating an exemplary system environment in which one embodiment for a calendar event management system may be implemented. A network system environment 10 is shown in which a computer 12 may communicate with a server 14 over a network 16. The network 16 may be a public network, such as the Internet, or a private network, such as an intranet, LAN, WLAN, or WMAX, or a combination of thereof.

In one embodiment, the server 14 may execute a calendar application 18a, while a corresponding calendar client 18b executes on the computer 12. The calendar client 18b may be implemented as a browser, applet, an application, and the like. The calendar application 18a and the calendar client 18b will be collectively referred to as the calendar application 18. One basic function of the calendar application 18 is to enable a user to schedule and edit calendar events, such as meetings/appointments and tasks. The calendar application 18a on the server 14 may store data including the scheduled calendar events and serve requests for the data received from the calendar client 18b. In an enterprise environment, for example, the user may access and interact with the calendar application 18a through a graphical user interface of the calendar client 18b. In an alternative embodiment, the functionality of the calendar application 18 may be provided in a desktop application that executes entirely on the computer 12.

In accordance with the exemplary embodiment, the calendar application 18 may further include an out-of-office component 20 that provides a user with improved management capabilities of scheduled calendar events. In one embodiment, the out-of-office component 20 enables a user 26 to have scheduled calendar events automatically managed when the user 26 is preparing for time out-of-office, i.e., a time period for which the user 26 will be away from the office and generally unavailable for meetings. The out-of-office component 20 may further include user configurable calendar preferences (not shown), which may include parameter settings and/or rules for controlling how the out-of-office component 20 automatically manages the scheduled events during the user's out-of-office time period.

In one embodiment, the out-of-office component 20 may be part of either the calendar application 18a or the calendar client 18b, and therefore may be executed by the server 14 or the computer 12, respectively. In another embodiment, the out-of-office component 20 may be implemented as a plug-in for the calendar application 18, or as a completely separate application.

In an enterprise environment, the server 14 may also have direct or network access to a lightweight directory access protocol (LDAP) directory 22, where LDAP is typically an application protocol for querying and modifying directory services. The LDAP directory 22 may include a tree of entries that may reflect various organizational, geographic, and/or political boundaries, depending on the implementation model chosen. One common example is an employee organization chart, which lists each employee and interrelationships of positions within an organization in terms of authority and responsibility. Example types of LDAP directories include Microsoft Active Directory® (AD), Sun Java One, Oracle Internet Directory, IBM Directory Server, and Novell eDirectory™. ("Active Directory" is a registered trademark of Microsoft Corporation in the United States, other countries, or both. "eDirectory" is a trademark of Novell, Inc. in the United States, other countries, or both.)

The server 14 may also have direct or network access to a social network server 24. A social network may represent a social structure made of nodes generally representing individuals or organizations. The social network may represent relationships and flows between people, groups, organizations, computers or other information/knowledge processing entities. Example common social networks today include LinkedIn®, Facebook®, and MySpace®. ("LinkedIn" is a registered trademark of LinkedIn Corporation in the United States, other countries, or both. "Facebook" is a registered trademark of Facebook, Inc. in the United States, other countries, or both. "MySpace" is a registered trademark of Myspace, LLC in the United States, other countries, or both.)

The computer 12 may exist in various forms, such as a personal computer (PC), (e.g., desktop, laptop, or notebook), a cell phone, a personal digital assistant (PDA), a set-top box, a game system, and the like. Both the server 14 and the computer 12 may include components of typical computing devices, including a processor, input devices (e.g., keyboard, pointing device, microphone for voice commands, buttons, touchscreen, etc.), and output devices (e.g., a display device). The server 14 and computer 12 may further include computer-readable media, e.g., memory and storage devices (e.g., flash memory, hard drive, optical disk drive, magnetic disk drive, and the like) containing computer instructions that implement an embodiment of the calendar application 18 when executed by the processor.

Figure 2:
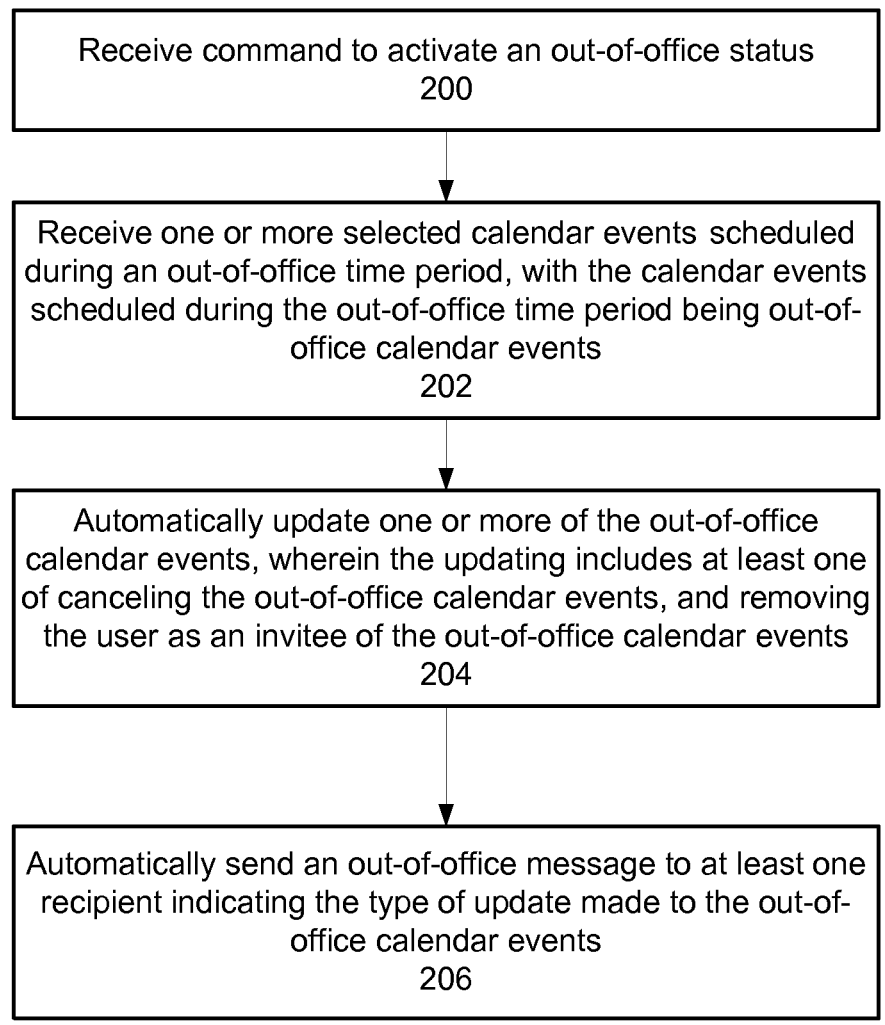
FIG. 2 is a diagram illustrating a process for managing calendar events according to an exemplary embodiment.

FIG. 2 is a diagram illustrating a process for managing calendar events according to an exemplary embodiment. The process may include receiving, by the calendar application 18 executing on the computer 12, a command to activate an out-of-office status 30 (block 200). The calendar application 18 may include the capability of displaying scheduled calendar events in a GUI (i.e., graphical user interface), and at least one control for activating the out-of-office status 30. The calendar events may be displayed, for example, in list or calendar format, while the control(s) for activating the out-of-office status 30 may be displayed as a button, in a dialog box, or in a drop down or context menu. The user 26 may select the displayed scheduled calendar events and activate the out-of-office status 30 using any suitable input device of the computer 12.

The calendar application 18 may receive one or more selected calendar events scheduled during an out-of-office time period, wherein the calendar events scheduled during the out-of-office time period are out-of-office calendar events (block 202).

In one embodiment, the calendar application 18 may receive the one or more selected calendar events as manual input from the user 26 (e.g., by clicking appropriate calendar events from a displayed calendar view). By allowing the user to pick and choose among the scheduled calendar events, certain calendar events considered important by the user (e.g., a meeting with the company director) can be passed over and remain scheduled.

The calendar application 18 may receive the user's activation of the out-of-office status 30 either before or after receiving the user selection of the scheduled calendar events. Therefore, the order of blocks 200 and 202 may be interchangeable. For example, in one embodiment, the calendar application 18 may receive the command to activate of the out-of-office status 30 prior to receiving the selection of calendar events. Alternatively, the calendar application 18 may receive the user's selection of the calendar events prior to receiving the command to activate the out-of-office status 30 (e.g., by the user 26 right clicking to display a context menu and selecting an "Out-of-Office" option).

In one embodiment, the user selection of the calendar events scheduled during the out-of-office time period may represent either the calendar events the user wants automatically updated, or may represent the scheduled calendar events the user wants to remain scheduled such that unselected out-of-office calendar events are updated. Such an option may be saved in the user-configurable out-of-office preferences.

In another embodiment, the calendar application 18 may automatically select the calendar events to update by receiving an out-of-office time period, and in response, automatically selecting scheduled calendar events that occur within the out-of-office time period. The calendar application 18 may receive the out-of-office time period either directly from user input, or by retrieving the out-of-office time period from the out-of-office preferences. In one embodiment, the out-of-office time period may be specified in the out-of-office preferences using a start date and an end date, or a start date and duration. In one embodiment, the calendar application 18a may receive the out-of-office preferences from the user 26 of the calendar client 18b, or from a third party, such as an enterprise system administrator. In one embodiment, either the calendar client 18b or the calendar application 18a may retrieve/access the out-of-office preferences.

In response to receiving the one or more selected calendar events, the calendar application 18 may automatically update one or more of the out-of-office calendar events, wherein the updating includes at least one of canceling the out-of-office calendar events, and removing the user as an invitee of the out-of-office calendar events (block 204).

In one embodiment, the calendar application 18 may access the out-of-office preferences to control how selected calendar events are updated through cancellation and editing. As described above, a parameter may be used to indicate whether selected or unselected calendar events should be updated. In another embodiment, how selected calendar events are updated and managed may be controlled based on direct user input (e.g., by querying the user 26 for input via a dialog box).

In response to updating the calendar events, the calendar application 18 automatically sends an out-of-office message to at least one recipient indicating the type of update (e.g., cancellation or modification) made to the out-of-office calendar events (block 206).

In one embodiment, individual out-of-office messages may be sent out for each calendar event update, or one out-of-office message may be sent out corresponding to a plurality of updated calendar events. The out-of-office message can be generic or customized based the type of calendar event updated. Any suitable type of electronic transmission may be used to send the out-of-office messages, including e-mail, text messaging, facsimile, voice mail and the like. The recipients of each of the out-of-office messages may be the same or different persons and the out-of-office messages may be addressed to more than one recipient. In one embodiment, the recipients of the out-of-office messages may be persons identified as event leaders, event schedulers, or based on an employee hierarchy relationship with the user 26, such as a boss or a subordinate, for example. Alternatively, all invitees of an updated calendar may be designated as recipients. For example, the cancellation function could be configured as follows. In one embodiment, if a user cancels a meeting as chairperson, then all attendees may be notified of the cancellation. In another embodiment, if a user cancels a meeting as an attendee, the chairperson of the meeting may be notified.

In one embodiment, following the update process an e-mail can be sent to the user 26 alerting them as to which out-ofoffice calendar events were not updated just in case the user accidentally overlooked them.

In the embodiment where the calendar application 18 is configured to only automatically cancel calendar events, the process may be described as follows. In response to the calendar application 18 receiving both the command to activate the out-of-office status and one or more selected calendar events, the calendar application 18 may automatically cancel the calendar events and send a notice of event cancellation for the canceled calendar event. Alternatively, instead of receiving a selection of calendar events, the calendar application 18 may receive an out-of-office time duration. In this case, the calendar application 18 may automatically cancel all of the calendar events that are scheduled during the out of office time duration, and then send notices of the event cancellations.

In one embodiment, where the user 26 is an event leader for one more of the updated calendar events, rather than a canceled calendar event, the updated calendar events can remain on the schedule, with another individual assuming responsibility as the event leader. As such, in response to the calendar application 18 receiving a reply from a recipient of an out-of-office message who is electing to assume a role as the event leader, the calendar application 18 may automatically revoke cancellation of the calendar event. Thus, the scheduling of that calendar event may be maintained even without the original event leader's attendance.

In one embodiment, the calendar application maybe configured to enable the user 26 to make multiple passes through the calendar event management process. For example, the user 26 may make a first pass where morning calendar events are cancelled. The user 26 may then realize that afternoon calendar events can't be attended either, and selects afternoon calendar events for cancellation.

In a further embodiment, the calendar application 18 may be configured to handle the out-of-office updating and message sending differentially. In one embodiment, the calendar application 18 may be configured to handle out-of-office calendar events differentially depending on a hierarchy of an organization directory, such as the LDAP directory 22. In one embodiment, rules can be established through a static directed acyclic graph (i.e., implicit management/reporting relationships that exist in the LDAP directory) to control differential handling of out-of-office calendar events and/or the sending of the out-of-office messages.

For example, invitees of a particular out-of-office calendar event can be compared to levels defined in the LDAP directory 22, and a rule can be defined specifying that an alert is to be provided to the user prior to deleting or updating the meeting if the event has been initiated and/or attended by a person above a third level line manager, for instance. In this embodiment, the user is made aware of the calendar event prior to the update or deletion (e.g., via a pop-up window), and can then decide whether or not it should be updated or deleted along with all the others that are within this out-of-office duration. As another example, the LDAP directory 22 can be leveraged via a rule that specifies that if an invitee senior to the user 26 has initiated a particular out-of-office calendar event, then that invitee should be sent a specific out-of-office message.

In yet a further embodiment, the calendar application 18 may be configured to handle out-of-office calendar events differentially depending on a closeness of the user 26 with respect to other invitees of the out-of-office calendar events as determined by the social network server 24. Similar to the embodiment above, the social network server 24 may be accessed to compare the user's social closeness to the invitees of a particular out-of-office calendar event, and a rule can be defined specifying that an alert is to be provided to the user prior to deleting or updating the meeting if a majority of the invitees are within a predetermined number of social levels of the user 26. In this embodiment, the user is made aware (e.g., via a pop-up window) prior to the update or deletion that the calendar event is associated with social networking connections, which could mean that the event may be scheduled with friends outside work during time off. The user may then decide whether or not the event should be updated or deleted along with all the others that are within this out-of-office duration. As another example, a rule can be defined specifying that a customized out-of-office message should be sent to the recipient containing the cell phone number of the user 26 if the recipient is a friend or buddy of the user 26 as determined by the social network server 24.

A system and method for managing calendar events has been disclosed. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method for managing calendar events, comprising:
   receiving, by a calendar application executing on a computer, a command to activate an out-of-office status for a user of the calendar application;
   responsive to receiving the command, activating, by the computer, the out-of-office status for the user for an out-of-office time period, the time period corresponding to a duration of the out-of-office status;
   responsive to the activating of the out-of-office status of the user, determining, by the computer, one or more selected calendar events scheduled for the user during the out-of-office time period, with the calendar events scheduled during the out-of-office time period being out-of-office calendar events; and
   processing each of the determined out-of-office calendar events, further comprising executing, by the computer:
      determining, from a social network, a number of social levels of closeness of the user with respect to each other invitee of the out-of-office calendar event;
      comparing the determined number of social levels of closeness of the user with respect to the each other invitee to a predetermined social level closeness number for the user, to thereby determine whether a majority of invitees of the out-of-office calendar event are within the predetermined number of social levels of closeness;
      automatically updating the out-of-office calendar event if the comparing determines that the majority of the invitees are within the determined number of social levels of closeness, wherein the updating includes at least one of canceling the out-of-office calendar event and removing the user as an invitee of the out-of-office calendar event; and
      automatically sending an out-of-office message to at least one recipient indicating a type of the updating of the out-of-office calendar event.

2. The method of claim 1, wherein the out-of-office time period is determined from user input provided by the user or from user-configured preferences for the user.

3. The method of claim 1, wherein the predetermined social level closeness number for the user is determined from user-configured preferences for the user, the user-configured preferences further indicating whether the automatically updating performs the canceling or the removing.

4. The method of claim 1, further comprising executing, by the computer:
   responsive to the updating, sending a message to the user, the message alerting the user as to the updating of the out-of-office calendar event.

5. The method of claim 1, further comprising executing, by the computer:
   responsive to the calendar application receiving a reply from any one of the at least one recipient, the reply indicating that the any one elects to assume a role as an event leader of the out-of-office calendar event for which the updating comprises canceling the out-of-office calendar event, revoking the canceling of the out-of-office calendar event.

6. A calendar management system comprising:
   a computer comprising a processor; and
   a computer readable medium storing instructions which are executable, using the processor, to perform functions comprising:
      receiving a command to activate an out-of-office status for a user of a calendar-application;
      responsive to receiving the command, activating the out-of-office status for the user for an out-of-office time period, the time period corresponding to a duration of the out-of-office status;
      responsive to the activating of the out-of-office status of the user, determining one or more selected calendar events scheduled for the user during the out-of-office time period, with the calendar events scheduled during the out-of-office time period being out-of-office calendar events; and
      processing each of the determined out-of-office calendar events, further comprising:
         determining, from a social network, a number of social levels of closeness of the user with respect to each other invitee of the out-of-office calendar event;
         comparing the determined number of social levels of closeness of the user with respect to the each other invitee to a predetermined social level closeness number for the user, to thereby determine whether a majority of invitees of the out-of-office calendar event are within the predetermined number of social levels of closeness;
         automatically updating the out-of-office calendar event if the comparing determines that the majority of the invitees are within the determined number of social levels of closeness, wherein the updating includes at least one of canceling the out-of-office calendar event and removing the user as an invitee of the out-of-office calendar event; and
         automatically sending an out-of-office message to at least one recipient indicating a type of updating of the out-of-office calendar event.

7. The system of claim 6, wherein the out-of-office time period is determined from user input provided by the user or from user-configured preferences for the user.

8. The system of claim 6, wherein the predetermined social level closeness number for the user is determined from user-configured preferences for the user, the user-configured preferences further indicating whether the automatically updating performs the canceling or the removing.

9. The system of claim 6, wherein the functions further comprise:
   responsive to the updating, sending a message to the user, the message alerting the user as to the updating of the out-of-office calendar event.

10. The system of claim 6, wherein the functions further comprise:
    responsive to receiving a reply from any one of the at least one recipient, the reply indicating that the any one elects to assume a role as an event leader of the out-of-office calendar event for which the updating comprises canceling the out-of-office calendar event, revoking the canceling of the out-of-office calendar event.

11. A non-transitory computer-readable medium containing program instructions for managing calendar events, which upon execution by a computer cause the computer to perform functions comprising:
    receiving, by a calendar application executing on a computer, a command to activate an out-of-office status for a user of the calendar application;

responsive to receiving the command, activating the out-of-office status for the user for an out-of-office time period, the time period corresponding to a duration of the out-of-office status;

responsive to the activating of the out-of-office status of the user, determining one or more selected calendar events scheduled for the user during the out-of-office time period, with the calendar events scheduled during the out-of-office time period being out-of-office calendar events; and processing each of the determined out-of-office calendar events, further comprising:

determining, from a social network, a number of social levels of closeness of the user with respect to each other invitee of the out-of-office calendar event;

comparing the determined number of social levels of closeness of the user with respect to the each other invitee to a predetermined social level closeness number for the user, to thereby determine whether a majority of invitees of the out-of-office calendar event are within the predetermined number of social levels of closeness;

automatically updating of the out-of-office calendar event if the comparing determines that the majority of the invitees are within the determined number of social levels of closeness, wherein the updating includes at least one of canceling the out-of-office calendar event and removing the user as an invitee of the out-of-office calendar event; and automatically sending an out-of-office message to at least one recipient indicating a type of the updating of the out-of-office calendar event.

\* \* \* \* \*